United States Patent
Ashiwal et al.

(10) Patent No.: US 12,284,703 B2
(45) Date of Patent: Apr. 22, 2025

(54) DATA TRANSPORT MANAGEMENT FOR DUAL CONNECTIVITY 5G-CAPABLE WIRELESS DEVICES

(71) Applicant: Apple Inc., Cupertino, CA (US)

(72) Inventors: Vijendrakumar K. Ashiwal, San Jose, CA (US); Bharath Jayaram, San Jose, CA (US); Sandeep K. Sunkesala, San Jose, CA (US); Sanjeevi Balasubramanian, San Jose, CA (US); Sharad Garg, San Jose, CA (US); Vijay Gadde, San Jose, CA (US); Vijay Venkataraman, San Jose, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 518 days.

(21) Appl. No.: 17/805,434

(22) Filed: Jun. 3, 2022

(65) Prior Publication Data
US 2023/0397271 A1   Dec. 7, 2023

(51) Int. Cl.
*H04W 76/15* (2018.01)
*H04W 72/21* (2023.01)
(Continued)

(52) U.S. Cl.
CPC .......... *H04W 76/15* (2018.02); *H04W 72/21* (2023.01); *H04W 72/23* (2023.01); *H04W 72/54* (2023.01); *H04W 72/569* (2023.01)

(58) Field of Classification Search
CPC ... H04L 5/0044; H04L 5/0064; H04L 5/0094; H04W 72/1268; H04W 72/21;
(Continued)

(56) References Cited

U.S. PATENT DOCUMENTS 10,368,264 B2 * 7/2019 Yi .................... H04W 72/21
10,813,003 B2 * 10/2020 Yi ...................... H04L 41/0681
(Continued)

FOREIGN PATENT DOCUMENTS

CA    3227941 A1 *  2/2023  ........... H04L 1/1812
CN  110870342 A  *  3/2020  .......... H04W 28/085
(Continued)

*Primary Examiner* — Eric Nowlin
(74) *Attorney, Agent, or Firm* — DICKINSON WRIGHT RLLP

(57) ABSTRACT

This application describes methods and apparatus to manage data transport across multiple radio links for 5G-capable wireless devices. Under certain criteria, including performance of at least one radio link, a mobility state of a 5G-capable wireless device, and data transport requirements for a latency sensitive application session, the 5G-capable wireless device sends buffer status report (BSR) requests for one or more both of the radio links to prioritize and transition uplink (UL) data between radio links before a measurement reporting threshold is met. In some embodiments, the 5G-capable wireless device proactively sends BSR requests for radio resources before the UL data is generated by the latency sensitive application session. In some embodiments, the 5G-capable wireless device duplicates UL data for the latency sensitive application session across multiple radio links.

20 Claims, 11 Drawing Sheets

(51) Int. Cl.
*H04W 72/23* (2023.01)
*H04W 72/54* (2023.01)
*H04W 72/566* (2023.01)

(58) Field of Classification Search
CPC ... H04W 72/23; H04W 72/54; H04W 72/569; H04W 76/15
See application file for complete search history.

(56) References Cited

U.S. PATENT DOCUMENTS

| | | | | |
|---|---|---|---|---|
| 11,272,397 | B2* | 3/2022 | Kuo | H04W 28/06 |
| 11,291,080 | B2* | 3/2022 | Dhanapal | H04W 28/0268 |
| 11,310,855 | B2* | 4/2022 | Hashmi | H04W 28/0864 |
| 11,425,752 | B2* | 8/2022 | Adjakple | H04W 72/1268 |
| 11,503,497 | B2* | 11/2022 | Yi | H04J 11/00 |
| 11,751,217 | B2* | 9/2023 | Adjakple | H04W 72/54 370/329 |
| 12,069,694 | B2* | 8/2024 | Adjakple | H04W 72/1268 |
| 12,075,454 | B2* | 8/2024 | Wang | H04W 28/082 |
| 2015/0098322 | A1 | 4/2015 | Chen | H04W 28/0864 370/230 |
| 2017/0013498 | A1* | 1/2017 | Yi | H04L 1/1812 |
| 2019/0098606 | A1* | 3/2019 | Sharma | H04B 7/0404 |
| 2019/0132771 | A1* | 5/2019 | Jheng | H04W 76/15 |
| 2019/0297524 | A1* | 9/2019 | Yi | H04W 28/0278 |
| 2020/0260515 | A1* | 8/2020 | Hashmi | H04W 76/27 |
| 2020/0267753 | A1* | 8/2020 | Adjakple | H04W 72/54 |
| 2020/0413286 | A1* | 12/2020 | Yi | H04W 28/0278 |
| 2021/0014728 | A1* | 1/2021 | Kuo | H04W 28/06 |
| 2021/0345454 | A1* | 11/2021 | Dhanapal | H04W 76/27 |
| 2022/0053502 | A1* | 2/2022 | Wang | H04W 28/08 |
| 2022/0264687 | A1* | 8/2022 | Orsino | H04W 76/15 |
| 2022/0330320 | A1* | 10/2022 | Adjakple | H04W 72/1268 |
| 2022/0386172 | A1* | 12/2022 | Xie | H04W 28/0278 |
| 2023/0036966 | A1* | 2/2023 | Agarwal | H04W 36/26 |
| 2023/0199881 | A1* | 6/2023 | Freda | H04L 5/0055 370/329 |
| 2023/0308905 | A1* | 9/2023 | Teyeb | H04L 5/0035 |
| 2023/0362946 | A1* | 11/2023 | Adjakple | H04W 72/54 |
| 2023/0397271 | A1* | 12/2023 | Ashiwal | H04W 72/21 |
| 2023/0403646 | A1* | 12/2023 | Wallentin | H04W 52/0229 |
| 2024/0147471 | A1* | 5/2024 | Islam | H04W 72/232 |
| 2024/0172306 | A1* | 5/2024 | Wallentin | H04W 28/0278 |
| 2024/0223326 | A1* | 7/2024 | Zou | H04W 28/0278 |
| 2024/0244479 | A1* | 7/2024 | Kanamarlapudi | H04W 28/0278 |
| 2024/0298370 | A1* | 9/2024 | Freda | H04W 40/22 |
| 2024/0357693 | A1* | 10/2024 | Zou | H04W 28/0252 |

FOREIGN PATENT DOCUMENTS

| | | | | |
|---|---|---|---|---|
| CN | 116326170 A | * | 6/2023 | H04W 76/15 |
| CN | 117796110 A | * | 3/2024 | H04L 1/1812 |
| CN | 117882485 A | * | 4/2024 | H04W 40/12 |
| EP | 2858441 A1 | * | 4/2015 | H04W 28/0252 |
| EP | 2858441 B1 | * | 3/2018 | H04W 28/0252 |
| EP | 3764573 A1 | * | 1/2021 | H04B 17/318 |
| EP | 3906751 B1 | * | 10/2023 | H04L 5/001 |
| EP | 4316178 B1 | * | 8/2024 | H04W 28/0252 |
| EP | 4272510 B1 | * | 9/2024 | H04W 28/0278 |
| EP | 4381868 B1 | * | 9/2024 | H04L 1/1812 |
| JP | 2024512697 A | * | 3/2024 | |
| JP | 2024530922 A | * | 8/2024 | |
| JP | 2024531885 A | * | 9/2024 | |
| KR | 20230028243 A | * | 2/2023 | |
| TW | I704830 B | * | 9/2020 | |
| WO | WO-2017140361 A1 | * | 8/2017 | H04B 7/0404 |
| WO | WO-2018075828 A1 | * | 4/2018 | H04W 72/02 |
| WO | WO-2020166948 A1 | * | 8/2020 | H04L 5/001 |
| WO | WO-2021236719 A1 | * | 11/2021 | H04L 5/001 |
| WO | WO-2022019821 A1 | * | 1/2022 | H04W 76/15 |
| WO | WO-2022024092 A1 | * | 2/2022 | H04L 5/0035 |
| WO | WO-2022031197 A1 | * | 2/2022 | |
| WO | WO-2022211694 A1 | * | 10/2022 | H04W 28/0252 |
| WO | WO-2023011806 A1 | * | 2/2023 | H04L 1/1812 |
| WO | WO-2023014798 A1 | * | 2/2023 | H04W 40/12 |
| WO | WO-2023117080 A1 | * | 6/2023 | H04L 5/001 |
| WO | WO-2023235011 A1 | * | 12/2023 | H04W 72/1226 |

* cited by examiner

DATA TRANSPORT MANAGEMENT FOR DUAL CONNECTIVITY 5G-CAPABLE WIRELESS DEVICES

FIELD

The described embodiments relate to wireless communications, including methods and apparatus to manage data transport across multiple radio frequency links for 5G-capable wireless devices.

BACKGROUND

Newer generation, e.g., fifth generation (5G) new radio (NR), cellular wireless networks that implement one or more $3^{rd}$ Generation Partnership Project (3GPP) 5G standards are rapidly being developed and deployed by network operators worldwide. The newer cellular wireless networks provide a range of packet-based services, with 5G technology providing increased data throughput and lower latency connections that promise enhanced mobile broadband services for 5G-capable wireless devices. The higher data throughput and lower latency of 5G is expected to usher in a range of new applications and services as well as improve existing ones. Mobile network operators (MNOs) are deploying 5G technology in stages and will continue to offer earlier generation, e.g., fourth generation (4G) Long Term Evolution (LTE), connectivity in parallel with 5G. In addition, 5G cellular connectivity can use two distinct radio frequency (RF) bands, a first RF band below 8 GHz providing lower data rates over longer ranges and a second RF band above 24 GHz providing higher data rates over shorter ranges. Dual connectivity allows a 5G-capable wireless device to connect via both 5G and 4G technologies or via two different 5G RF bands simultaneously. Cellular wireless networks determine how to allocate radio frequency resources for data transport across multiple radio links to a 5G-capable wireless device. Signal quality and throughput performance of data connections varies as a 5G-capable wireless device moves throughout a cellular wireless coverage area. Certain latency sensitive applications can require consistent data throughput, including under varying signal conditions, to perform well for a user. There exists a need for mechanisms to manage data transport for dual connectivity 5G-capable wireless devices.

SUMMARY

This application relates to wireless communications, including methods and apparatus to manage data transport across multiple radio frequency links for 5G-capable wireless devices. In a 5G non-standalone (NSA) cellular wireless network, a 5G-capable wireless device can establish radio links using two different radio access technologies, e.g., a 5G radio link and a 4G LTE radio link, simultaneously. The 5G-capable wireless device can alternatively connect to a 5G NSA cellular wireless network using one or two 5G radio links, which can be carried in a lower radio frequency band (FR1), typically below 8 GHz, and/or in a higher radio frequency band (FR2), typically above 24 GHz. When a 5G-capable wireless device is connected via two radio links simultaneously, the 5G NSA cellular wireless network schedules data transport via a master cell group (MCG) and via a secondary cell group (SCG). When certain criteria are met, such as when performance via the SCG is inadequate for an ongoing latency sensitive application session, the wireless device can request radio resources via the MCG to transport higher priority (more critical) data of the latency sensitive application session. Exemplary criteria include: i) measured (or estimated) performance via the SCG falls below a first performance threshold, e.g., a measured level of reference signal received power (RSRP)<−100 dBM, while the SCG performance exceeds a measurement reporting threshold, e.g., an A2 threshold, set by the 5G NSA cellular wireless network, and ii) a mobility state of the 5G-capable wireless device indicates that the 5G-capable wireless device is stationary, e.g., translational speed of movement detected by a motion co-processor indicates the 5G capable wireless device is below a first speed threshold. The wireless device sends buffer status report (BSR) request messages to the 5G NSA cellular wireless network to indicate pending uplink (UL) data for transport via the MCG and prioritizes sending higher priority data of the latency sensitive application session using grants via the MCG received from the 5G NSA cellular wireless network. Exemplary higher priority (more critical) data include information frames (I-frames) generated by a video streaming application session or a video call application session. Lower priority (less critical) data can be sent after the higher priority data is accommodated. Exemplary lower priority data include parity frames (P-frames) generated by the video streaming application session or the video call application session. In some embodiments, higher priority data, e.g., I-frames, of the latency sensitive application session are generated in accordance with a periodic pattern, and the 5G-capable wireless device proactively triggers a BSR request message on the MCG before the latency sensitive application session generates the higher priority data. The 5G-capapble wireless device anticipates data transport requirements for an ongoing latency sensitive application session and acquires radio link resources in advance to accommodate the higher priority data when later provided by the latency sensitive application session for UL data transport.

When additional criteria are met, the 5G-capable wireless device can shift all data for the latency sensitive application session from the SCG to the MCG, to concentrate data transport on the higher performing (MCG-based) radio link. In some embodiments, the 5G-capable wireless device duplicates UL data for the latency sensitive application session across both MCG and SCG radio links, to increase UL transmission redundancy and thereby improve reception by the 5G NSA cellular wireless network of the UL data for the latency sensitive application session, which may be encountering variable radio link conditions. Exemplary additional criteria include: i) performance via the SCG falls below a second performance threshold, e.g., the measured RSRP<−105 dBM, while still exceeding the measurement reporting threshold, e.g., A2 threshold, set by the 5G NSA cellular wireless network, and ii) the mobility state of the 5G-capable wireless device indicates that the 5G-capable wireless device is non-stationary, e.g., a translational speed of movement detected by the motion co-processor indicates the 5G-capable wireless device is above a second speed threshold higher than the first speed threshold. In some embodiments, the 5G-capable wireless device sends additional BSR request messages for the MCG using a select value included in a buffer size field of the BSR request messages (independent of an amount of pending UL data), the select value chosen to cause the cellular wireless network to grant a higher level of radio link resources via the MCG to accommodate UL data for the ongoing latency sensitive application session. In some embodiments, the select value in the buffer size field is a value sufficiently large to cause all UL data to be shifted to the MCG. In some embodiments, the select value in the buffer size field is a maximum value allowed for use in the buffer size field.

In some embodiments, the 5G-capable wireless device sends additional BSR request messages for both the MCG and the SCG with select values included in the buffer size fields (independent of an amount of pending UL data) to cause the cellular wireless network to grant a higher level of radio link resources via both the MCG and the SCG to accommodate redundant transmission of data for the latency sensitive application session across both the MCG and the SGC. In some embodiments, the select values included in the buffer size field are maximum values that are allowed for use in the buffer size field. In some embodiments, the 5G-capable wireless device sends UL data for the latency sensitive application session via the MCG or the SCG using an earliest received radio resource grant (whether on the MCG or on the SCG). In some embodiments, the 5G-capable wireless device continues to send additional BSR request messages with select values in the buffer size field for the MCG alone or for both the MCG and the SCG while the additional criteria continue to be met, e.g., performance of the SCG remains below the second performance threshold and the mobility state of the 5G-capable wireless device indicates the 5G-capable wireless device is non-stationary. In some embodiments, the 5G-capable wireless device sends additional BSR request messages with select values in the buffer size field for the MCG until a BSR requirement on the MCG is met and a latency requirement for the latency sensitive application session is satisfied. When the BSR requirement is not met on the MCG or the latency requirement for the latency sensitive application session is not satisfied, the 5G-capable wireless device continues to send additional BSR request messages with select values in the buffer size field for the MCG. In some embodiments, the 5G-capable wireless device sends additional BSR request messages with select values in the buffer size field for both the MCG and the SCG until a BSR requirement is met on the MCG or the SCG and a latency requirement for the latency sensitive application session is satisfied. When the BSR requirement is not met on the MCG or the SCG or the latency requirement for the latency sensitive application session is not satisfied, the 5G-capable wireless device continues to send additional BSR request messages with select values in the buffer size field for the MCG and the SCG. In some embodiments, the 5G-capable wireless device stops sending additional BSR request messages with select values in the buffer size field for the MCG or the SCG when data transport for the latency sensitive application session is no longer required, e.g., a session for the latency sensitive application is not active or ends. In some embodiments, the 5G-capable wireless device stops sending additional BSR request messages with select values in the buffer size field for the MCG or the SCG when the mobility state of the 5G-capable wireless device indicates the 5G-capable wireless device is stationary.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
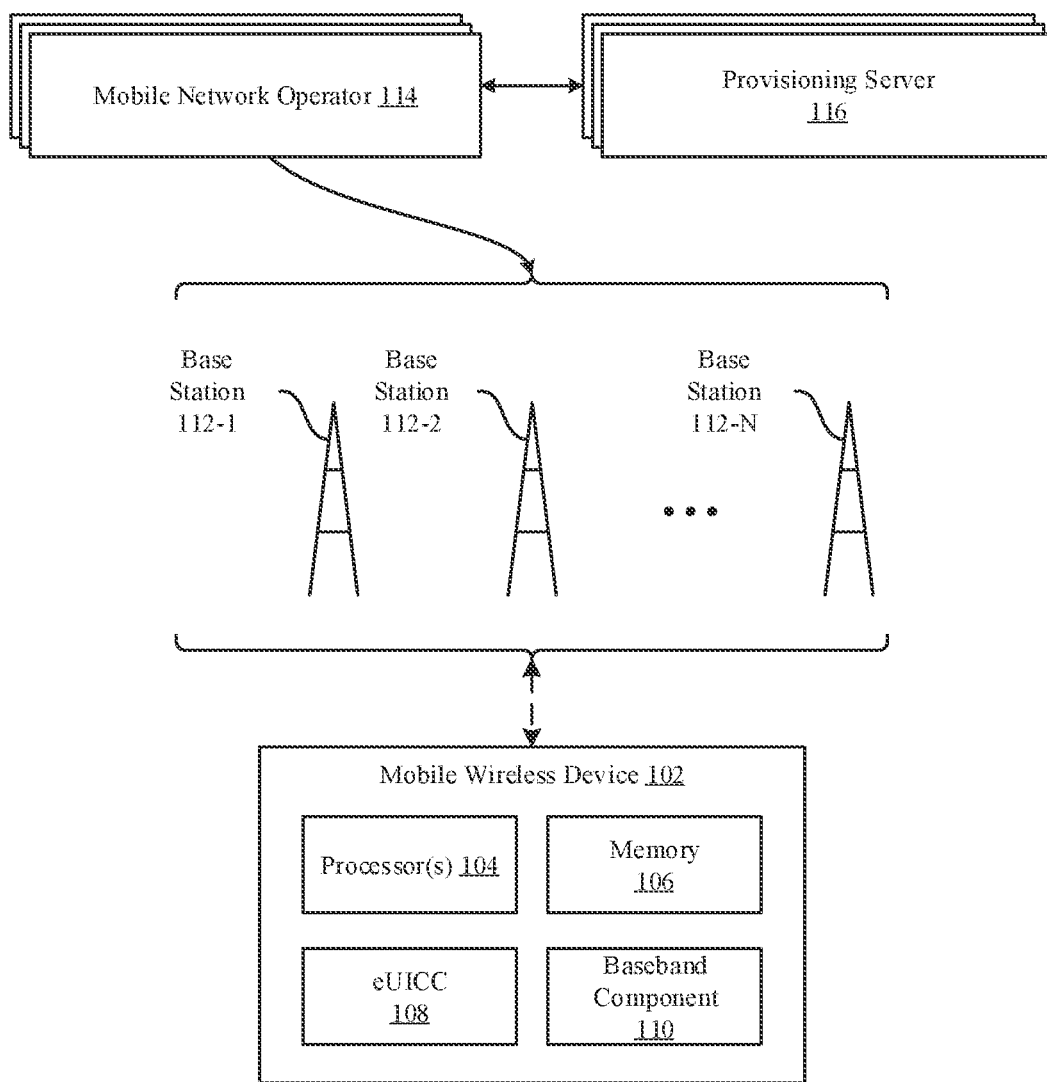
FIG. 1 illustrates a block diagram of different components of an exemplary system configured to implement cellular service provisioning to a wireless device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

This application relates to wireless communications, including methods and apparatus to manage data transport across multiple radio frequency links for 5G-capable wireless devices. In a 5G non-standalone (NSA) cellular wireless network, a 5G-capable wireless device can establish radio links using two different radio access technologies, e.g., a 5G radio link and a 4G LTE radio link, simultaneously. The 5G-capable wireless device can alternatively connect to a 5G NSA cellular wireless network using one or two 5G radio links, which can be carried in a lower radio frequency band (FR1), typically below 8 GHz, and/or in a higher radio frequency band (FR2), typically above 24 GHz. When a 5G-capable wireless device is connected via two radio links simultaneously, the 5G NSA cellular wireless network schedules data transport via one or both radio links. In some cases, the 5G NSA cellular wireless network schedules uplink (UL) data transport for an active application of the 5G-capable wireless device via a first radio link (with few or no radio link resources assigned for data via a second radio link), e.g., when the first radio link has adequate performance to meet a requested quality of service (QoS) for the active application. In some cases, the first radio link provides a higher maximum data throughput capability than the second radio link, such as i) when the first radio link provides a 5G radio link and the second radio link provides a 4G LTE radio link, or ii) when the first radio link uses FR2 while the second radio link uses FR1. As radio link performance varies throughout a wireless cell coverage area, the 5G NSA cellular wireless network can re-allocate radio link resources for UL data transport by the 5G-capable wireless device from the first radio link to the second radio link, when the first radio link performance degrades. Present scheduling mechanisms of cellular wireless networks result in a gradual transition of UL data transport between radio links. When the transition to the second radio link is too slow, UL data can accumulate for transport at the 5G-capable wireless device, as performance via the first radio link can degrade more quickly than the data transport transition from the first radio link to the second radio link by the 5G NSA cellular wireless network can accommodate. A spike in latency for a latency sensitive application can result from the delayed UL data transport, which can impact performance of an ongoing latency sensitive application session. In some cases, such as when transitioning from a 5G radio link to a 4G LTE radio link, the 5G NSA cellular wireless network can schedule a higher level (or maximum amount) of radio resources for UL data transport via the 4G LTE radio link only after the 5G radio link performance falls below a critical threshold, or in some cases when the 5G radio link drops. During the transition by the 5G NSA cellular wireless network of UL data transport from the 5G radio link to the 4G LTE radio link, data throughput may be inadequate for the latency sensitive application session, and latency spikes can occur. Similar performance issues for latency sensitive application sessions can occur when transitioning from a higher frequency 5G radio band, e.g., FR2, to a lower frequency 5G radio band, e.g., FR1. To compensate for performance issues, the 5G-capable wireless device requests additional radio link resources, in anticipation of a transition between radio links and/or to accommodate variable radio frequency conditions that can impact UL data transport. The 5G-capable wireless device can prioritize UL data transport for higher priority (more critical) data over lower priority (less critical) data for a latency sensitive application session via the requested radio link resources. The 5G-capable wireless device can send buffer status report (BSR) request messages that include values in a buffer size field that exceed an amount of presently pending data to accommodate expected future data that may accumulate during the transition between radio links.

When certain criteria are met, the 5G-capable wireless device can request bandwidth via a master cell group (MCG) to transport higher priority (more critical) data of a latency sensitive application session. In some cases, the MCG provides higher performance data throughput than a secondary cell group (SCG) also in use. Example criteria include: i) performance via the SCG falls below a first performance threshold, e.g., a measured level of reference signal received power (RSRP)<−100 dBm, while still exceeding a measurement reporting threshold, e.g., an A2 threshold, set by the cellular wireless network, and ii) a mobility state of the 5G-capable wireless device indicates that the 5G-capable wireless device is stationary, e.g., translational speed of movement detected by a motion co-processor indicates the 5G-capable wireless device is below a first speed threshold. The 5G-capable wireless device sends buffer status report (BSR) request messages to the cellular wireless network to indicate pending uplink (UL) data for transport via the MCG and prioritize sending higher priority data of the latency sensitive application session using grants via the MCG received from the cellular wireless network. Exemplary higher priority data include information frames (I-frames) of a video streaming application session or a video call application session. Lower priority (less critical) data can be sent after the higher priority data is accommodated. Exemplary lower priority data include parity frames (P-frames) of the video streaming application session or the video call application session. In some embodiments, higher priority data, e.g., I-frames, of the latency sensitive application session are generated in accordance with a periodic pattern, and the 5G-capable wireless device proactively triggers a BSR request message on the MCG before the latency sensitive application session generates the higher priority data to accommodate the higher priority data when later provided by the latency sensitive application session for UL data transport. The 5G-capable wireless device can monitor an application-level performance metric for the latency sensitive application session, e.g., a latency metric or a round trip time (RTT) metric, and trigger additional proactive actions to improve UL data performance for the latency sensitive application session.

When additional criteria are met, the 5G-capable wireless device can shift all data for the latency sensitive application session to the MCG from the SCG, to concentrate use on the higher performing radio link. In some cases, when additional criteria are met, the 5G-capable wireless device requests radio link resources via both the MCG and the SCG to allow for duplication of UL data for the latency sensitive application session across both the MCG and the SCG. The data duplication can increase transmission redundancy to improve reception by the cellular wireless network of the data for the latency sensitive application session under variable radio frequency conditions. Exemplary additional criteria include: i) performance via the SCG falls below a second performance threshold, e.g., the measured level of reference signal received power (RSRP)<−105 dBm, while still exceeding the measurement reporting threshold, e.g., A2 threshold, set by the cellular wireless network, and ii) the mobility state of the 5G-capable wireless device indicates that the 5G-capable wireless device is non-stationary, e.g., translational speed of movement detected by a motion co-processor indicates the 5G-capable wireless device is above a second speed threshold higher than the first speed threshold.

The 5G-capable wireless device can begin sending additional BSR request messages with a select value in a buffer size field on the MCG when the additional criteria are met. In some embodiments, the 5G-capable wireless device calculates a BSR value needed for each logical channel identifier (LCID) to be sent based on an UL data rate requirement for the latency sensitive application session. The 5G-capable wireless device can send the additional BSR request messages with select values included in the buffer size field for the MCG (independent of an amount of pending UL data and based on the underlying uplink data rate requirement for the latency sensitive application) to cause the cellular wireless network to grant a higher level of radio link resources via the MCG to accommodate data for the latency sensitive application session. In some embodiments, the additional BSR request messages for the MCG include a maximum value allowed in the buffer size field. With a higher level of granted radio link resources available via the MCG, the 5G-capable wireless device can transition UL data from the SCG to the MCG more quickly than relying on the cellular wireless network to use measurement reporting information, such as associated with an A2 threshold for transitioning between radio links. In some embodiments, the 5G-capable wireless device continues to send additional BSR request messages for the MCG with select values in the buffer size fields while additional criteria continue to be met, e.g., performance of the SCG below the second performance threshold and the mobility state of the 5G-capable wireless device indicates the 5G-capable wireless device is non-stationary (in motion). In some embodiments, the 5G-capable wireless device sends additional BSR request messages for the MCG with select values in the buffer size fields until a BSR requirement on the MCG is met and a latency requirement for the latency sensitive application session is satisfied. When the BSR requirement is not met on the MCG or the latency requirement for the latency sensitive application session is not satisfied, the 5G-capable wireless device continues to send additional BSR request messages for the MCG with select values in the buffer size field. In some embodiments, the select values included in the buffer size fields of the additional BSR request messages are maximum values allowed for the buffer size fields. In some embodiments, the additional BSR request messages can be maximal-valued BSR request messages, with maximum values in the buffer size fields.

In some embodiments, the 5G-capable wireless device sends additional BSR request messages for both the MCG and the SCG with select values included in the buffer size fields to cause the cellular wireless network to grant a higher level of radio link resources via both the MCG and the SCG to accommodate redundant transmission of data for the latency sensitive application session across both the MCG and the SGC. In some embodiments, the additional BSR request messages are maximal-valued BSR request messages with maximum allowed values in the buffer size fields. In some embodiments, the 5G-capable wireless device can duplicate and send UL data for the latency sensitive application session on both the MCG and the SCG. In some embodiments, the 5G-capable wireless device sends UL data via the MCG or via the SCG based on whichever cell group a grant of radio link resources is received. In some embodiments, the 5G-capable wireless device continues to send additional BSR request messages for both the MCG and the SCG with select values in the buffer size fields of the BSR request messages while the additional criteria continue to be met, e.g., performance of the SCG below the second performance threshold and the mobility state of the 5G-capable wireless device indicates the 5G-capable wireless device is non-stationary (in motion). In some embodiments, the 5G-capable wireless device sends additional BSR request messages with select values in the buffer size fields for both the MCG and the SCG until a BSR requirement is met on the MCG or the SCG and a latency requirement for the latency sensitive application session is satisfied. When the BSR requirement is not met on the MCG or the SCG or the latency requirement for the latency sensitive application session is not satisfied, the 5G-capable wireless device continues to send additional BSR request messages with the select values in the buffer size fields for the MCG and the SCG. In some embodiments, the 5G-capable wireless device stops sending the additional BSR request messages with select values in the buffer size fields for the MCG or the SCG when data transport for the latency sensitive application session is no longer required, e.g., a session for the latency sensitive application is not active or ends. In some embodiments, the 5G-capable wireless device stops sending the additional BSR request messages with select values in the buffer size field for the MCG or the SCG when the mobility state of the 5G-capable wireless device indicates the 5G-capable wireless device is stationary. In some embodiments, the 5G-capable wireless device sends maximal-valued BSR request messages with maximum values in the buffer size fields and reverts to regular BSR request messages after a transition between radio links completes.

These and other embodiments are discussed below with reference to FIGS. 1 through 7; however, those skilled in the art will readily appreciate that the detailed description given herein with respect to these figures is for explanatory purposes only and should not be construed as limiting.

FIG. 1 illustrates a block diagram of different components of a system 100 that includes i) a mobile wireless device 102, which can also be referred to as a wireless device, a wireless communication device, a mobile device, a user equipment (UE), a device, and the like, ii) a group of base stations 112-1 to 112-N, which are managed by different Mobile Network Operators (MNOs) 114, and iii) a set of provisioning servers 116 that are in communication with the MNOs 114. The mobile wireless device 102 can represent a mobile computing device (e.g., an iPhone® or an iPad® by Apple®), the base stations 112-1 to 112-N can represent cellular wireless network entities including fourth generation (4G) Long Term Evolution (LTE) evolved NodeBs (eNodeBs or eNBs) and/or fifth generation (5G) NodeBs (gNodeBs or gNBs) that are configured to communicate with the mobile wireless device 102, and the MNOs 114 can represent different wireless service providers that provide specific services (e.g., voice and data) to which a user of the mobile wireless device 102 can subscribe to access the services via the mobile wireless device 102. Applications resident on the mobile wireless device 102 can advantageously access services using 4G LTE connections and/or 5G connections via the base stations 112. The mobile wireless device 102 can include processing circuitry, which can include one or more processors 104 and a memory 106, an embedded Universal Integrated Circuit Card (eUICC) 108, and a baseband component 110. In some embodiments, the mobile wireless device 102 includes one or more physical UICCs, also referred to as Subscriber Identity Module (SIM) cards (not shown), in addition to the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing services offered by one or more different MNOs 114 via communication through base stations 112-1 to 112-N. To be able to access services provided by the MNOs, one or more eSIMs can be provisioned to the eUICC 108 of the mobile wireless device 102. In some embodiments, policies associated with SIMs/eSIMs can determine whether a mobile wireless device 102 can access 5G services via 5G base stations 112. In some embodiments, SIM/eSIM policies can determine cost factors, data throughput rate limits, data capacity limits, application service compatibility, device compatibility, and other criteria for determining whether one or more applications of a mobile wireless device 102 can access 5G services. In some embodiments, SIM/eSIM policies and/or device configurations can determine whether one or more applications can prefer access to services via one or more particular radio access technologies (RATs), e.g., via a 4G LTE connection, via a 5G connection, via a non-cellular wireless connection or the like.

Figure 2:
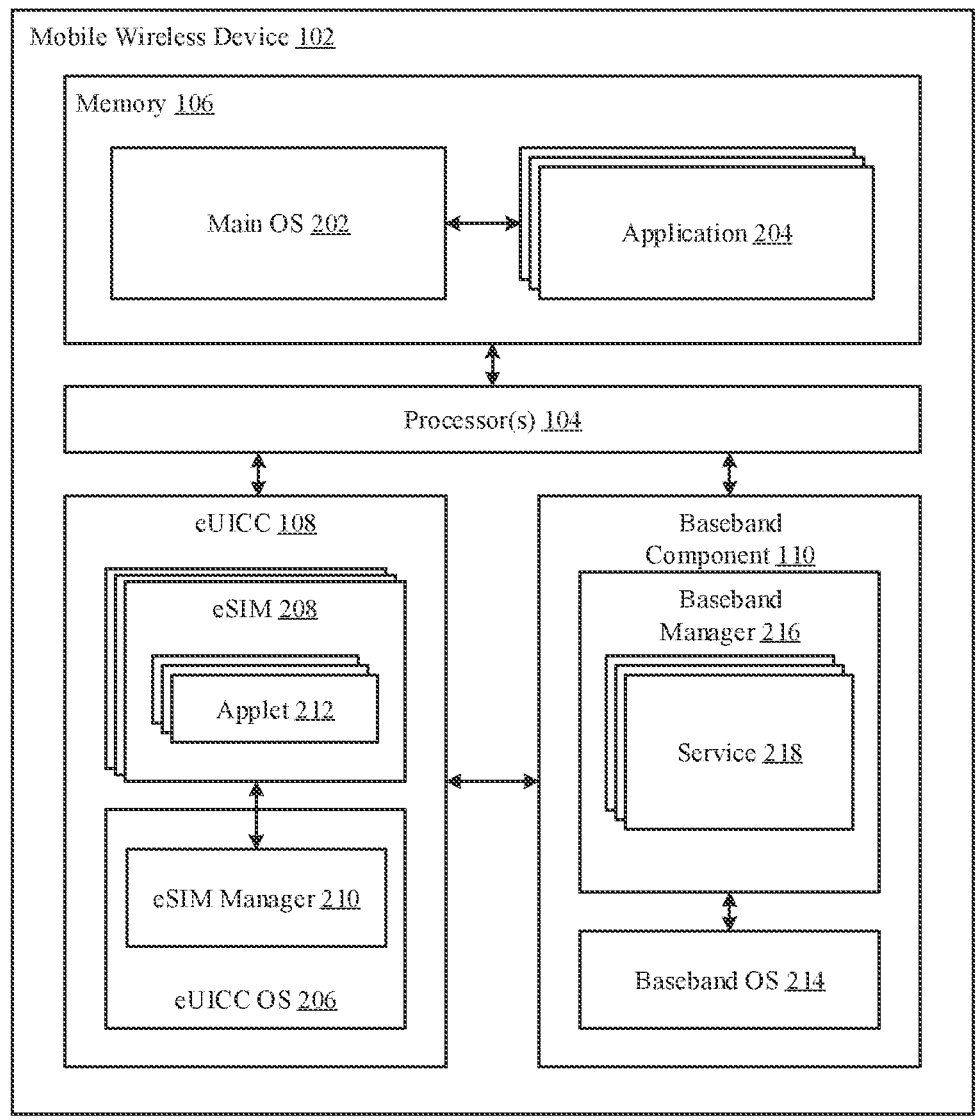
FIG. 2 illustrates a block diagram of a more detailed view of exemplary components of the system of FIG. 1, according to some embodiments.

FIG. 2 illustrates a block diagram 200 of a more detailed view of exemplary components of the system 100 of FIG. 1. The one or more processors 104, in conjunction with the memory 106, can implement a main operating system (OS) 202 that is configured to execute applications 204 (e.g., native OS applications and user applications). The one or more processors 104 can include applications processing circuitry and, in some embodiments, wireless communications control circuitry. The applications processing circuitry can monitor application requirements and usage to determine recommendations about communication connection properties, such as bandwidth and/or latency, and provide information to the communications control circuitry to determine suitable wireless connections for use by particular applications. The communications control circuitry can process information from the applications processing circuitry as well as from additional circuitry, such as the baseband component 110, and other sensors (not shown) to determine states of components of the mobile wireless device 102, e.g., reduced power modes, as well as of the mobile wireless device 102 as a whole, e.g., mobility states. The communications control circuitry, in some embodiments, can also account for SIM/eSIM policies that influence whether an application or service of the mobile wireless device 102 can access particular RATs, such as access to 5G cellular connections. The communications control circuitry can provide control signals to the baseband component 110 to determine which RATs particular applications can access. The mobile wireless device 102 further includes an eUICC 108 that can be configured to implement an eUICC OS 206 to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, updating, or otherwise performing management of the eSIMs 208 within the eUICC 108 and providing the baseband component 110 with access to the eSIMs 208 to provide access to wireless services for the mobile wireless device 102. The eUICC OS 206 can include an eSIM manager 210, which can perform management functions for various eSIMs 208. Each eSIM 208 can include a number of applets 212 that define the manner in which the eSIM 208 operates. For example, one or more of the applets 212, when implemented by the baseband component 110 and the eUICC 108, can be configured to enable the mobile wireless device 102 to communicate with an MNO 114 and provide useful features (e.g., phone calls and internet) to a user of the mobile wireless device 102.

A baseband component 110 of the mobile wireless device 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3A:
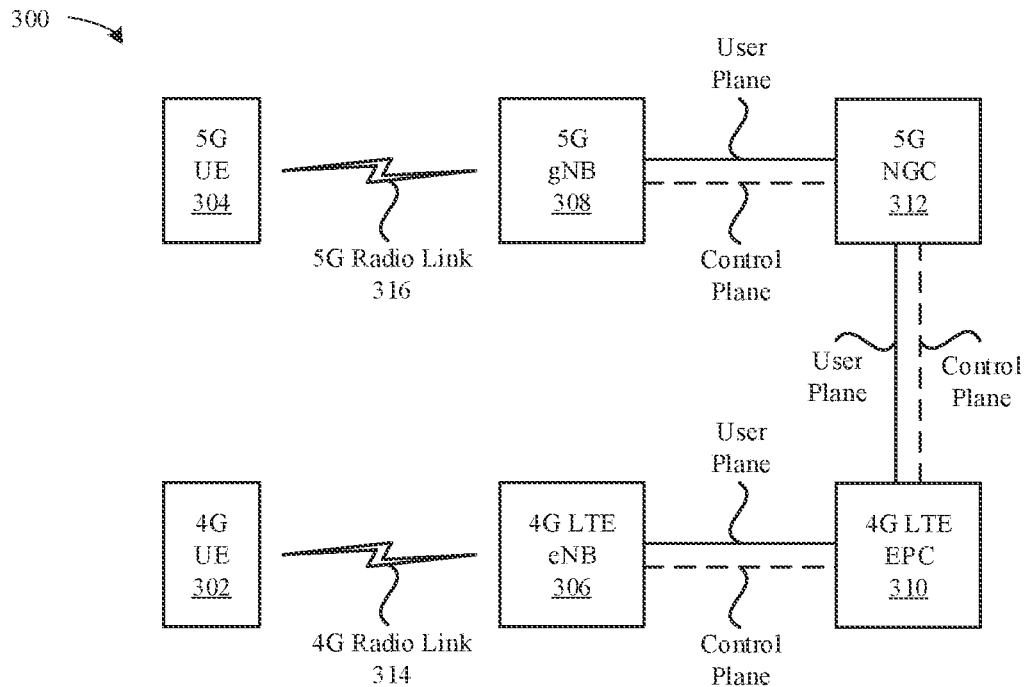
FIGS. 3A and 3B illustrate block diagrams of 5G non-standalone (NSA) and standalone (SA) network architectures, according to some embodiments.
Figure 3B:
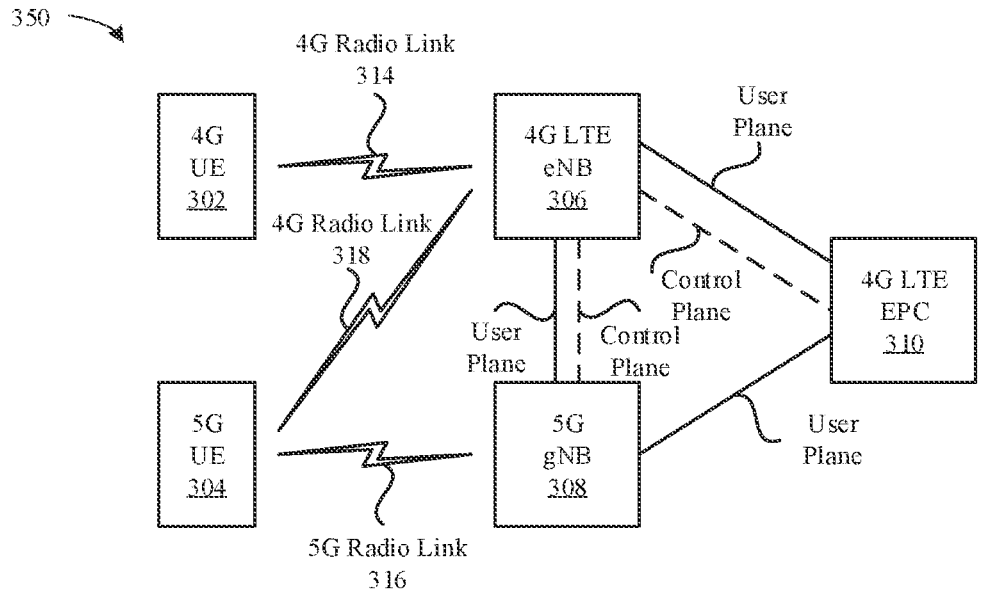

FIGS. 3A and 3B illustrate block diagrams 300, 350 of 5G standalone (SA) and non-standalone (NSA) network architectures respectively. Operating in a SA mode, as shown in FIG. 3A, a 5G user equipment (UE) 304 communicates with a cellular wireless network via a 5G radio link 316 to a 5G gNB (base station) 308, while a 4G UE 302 separately communicates with its own cellular wireless network via a 4G radio link 314 to a 4G LTE eNB 306. The 5G gNB 308 is connected to a 5G next generation core (NGC) network 312 including both a user plane connection for data transfer and a control plane connection for control signaling. Similarly, the 4G LTE eNB 306 is connected to a 4G LTE enhanced packet core (EPC) 310. The 4G LTE EPC 310 network can interwork with the 5G NGC 312 network via user plane and control connections between them. 5G SA networks that include both 5G access networks based on 5G gNBs 308 and a 5G NGC 312, however, are expected to take multiple years to build out, and as such a hybrid network that includes elements of both a 4G cellular wireless network and a 5G cellular wireless network is planned for 5G UEs 304 to operate in an NSA mode as illustrated by FIG. 3B. Operating in a NSA mode, a 5G UE 304 communicates with a cellular wireless network via both a 5G radio link 316 to a 5G gNB 308 and via a separate 4G radio link 318 to a 4G LTE eNB 306. The 4G LTE eNB 306 can be used for control plane signaling and act as a primary node for access network connection with the 5G UE 304, while the 5G gNB 308 can be used for user plane data transfer and act as a secondary node for access network connection with the 5G UE 304. The 5G gNB 308 can transfer user plane data to the 4G LTE EPC 310 when directly connected to the 4G LTE EPC 310 or when indirectly connected to the 4G LTE EPC 310 via the 4G LTE eNB 306, as indicated by the user plane connection between the 4G LTE eNB 306 and the 5G gNB 308. A 4G UE 302 (or a 5G UE 304 operating in a 4G LTE mode) can connect to the 4G LTE eNB 306 via the 4G radio link 314 for both control signaling and user plane data transfer.

Figure 4:
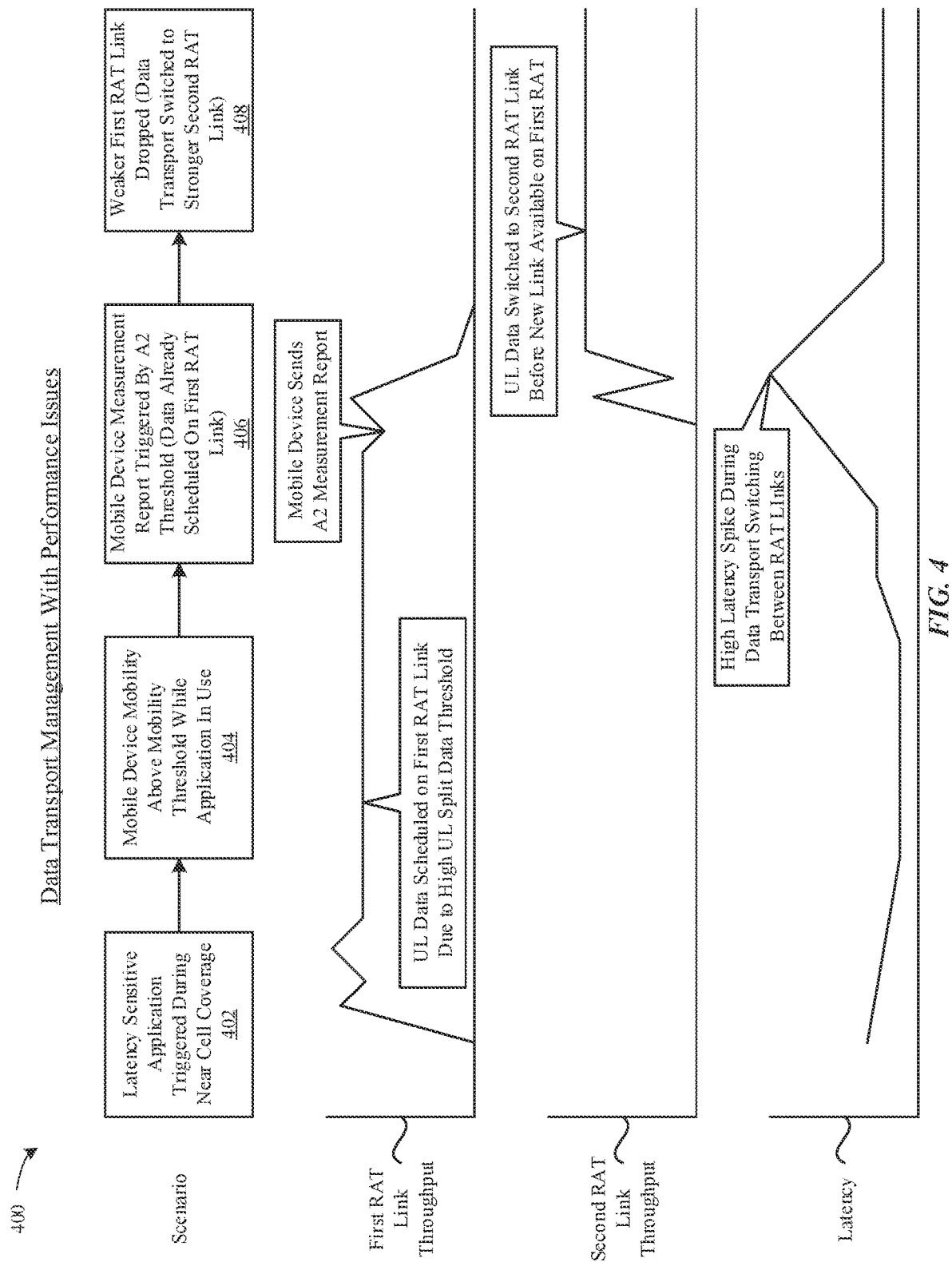
FIG. 4 illustrates an example of dual link radio data transport by a wireless device with latency performance issues, according to some embodiments.

FIG. 4 illustrates a diagram 400 of an example of dual radio link data transport for a wireless device 102 with latency performance issues. The 5G-capable wireless device 102 can be connected via a first radio access technology (RAT) link to a 5G NSA cellular wireless network and via a second RAT link to the 5G NSA cellular wireless network. In some cases, the first RAT link is a 5G radio link, while the second RAT link is a 4G LTE radio link. In some cases, the first RAT link is a 5G FR2 (higher frequency band) radio link and the second RAT link is a FR1 (lower frequency band) radio link. At 402, a latency sensitive application session can be triggered while the 5G-capable wireless device 102 is in a near cell coverage area (e.g., with high signal strength and/or quality). In some cases, the first RAT link provides a higher maximum level of data throughput than the second RAT link. Initially, the 5G NSA cellular wireless network can schedule UL data only via the first RAT link due to a high UL split bearer data threshold. While in the area of near cell coverage, the first RAT link is used for UL data transport for the latency sensitive application session, while the second RAT link is available but not used. At 404, a mobility state of the 5G-capable wireless device 102 can exceed a mobility threshold while the latency sensitive application session is ongoing. The 5G-capable wireless device 102 can move from an area of near cell coverage to an area of middle to far cell coverage with weaker radio link performance for the first RAT link. At 406, a mobile device measurement report, based on an A2 threshold set by the 5G NSA cellular wireless network, is triggered; however, UL data has already been scheduled for transport via the first RAT link when the A2 measurement report is sent to the NSA cellular wireless network. In response to the A2 measurement report, the 5G NSA cellular wireless network switches UL data from the first RAT link to the second RAT link (which can occur before a separate, new first RAT link is available to be used by the 5G-capable wireless device 102). During the transition from the first RAT link to the second RAT link, UL data is delayed due to a drop in performance of the first RAT link (over which UL data is already scheduled by the 5G NSA cellular wireless network) before full use of the second RAT link occurs. At 408, the weaker performing first RAT link is dropped, and UL data for the latency sensitive application session is switched to the stronger performing second RAT link. With sufficient data throughput on the second RAT link after the transition, the backup of UL data can ease and latency return to an acceptable level for the latency sensitive application session. The latency spike during the transition, however, can negatively impact perceived performance of the latency sensitive application session by a user of the 5G-capable wireless device 102. The sending of the A2 measurement report and the resulting response of the 5G NSA cellular wireless network to the A2 measurement report occurs too late and too slowly to accommodate a buildup of UL data for the latency sensitive application session during the transition between radio links. As discussed further herein, the 5G-capable wireless device 102 proactively requests radio link resources, before an A2 measurement report would occur, to use during a transition between radio links (or during variable RF conditions) to accommodate UL data for an ongoing latency sensitive application session.

Figure 5A:
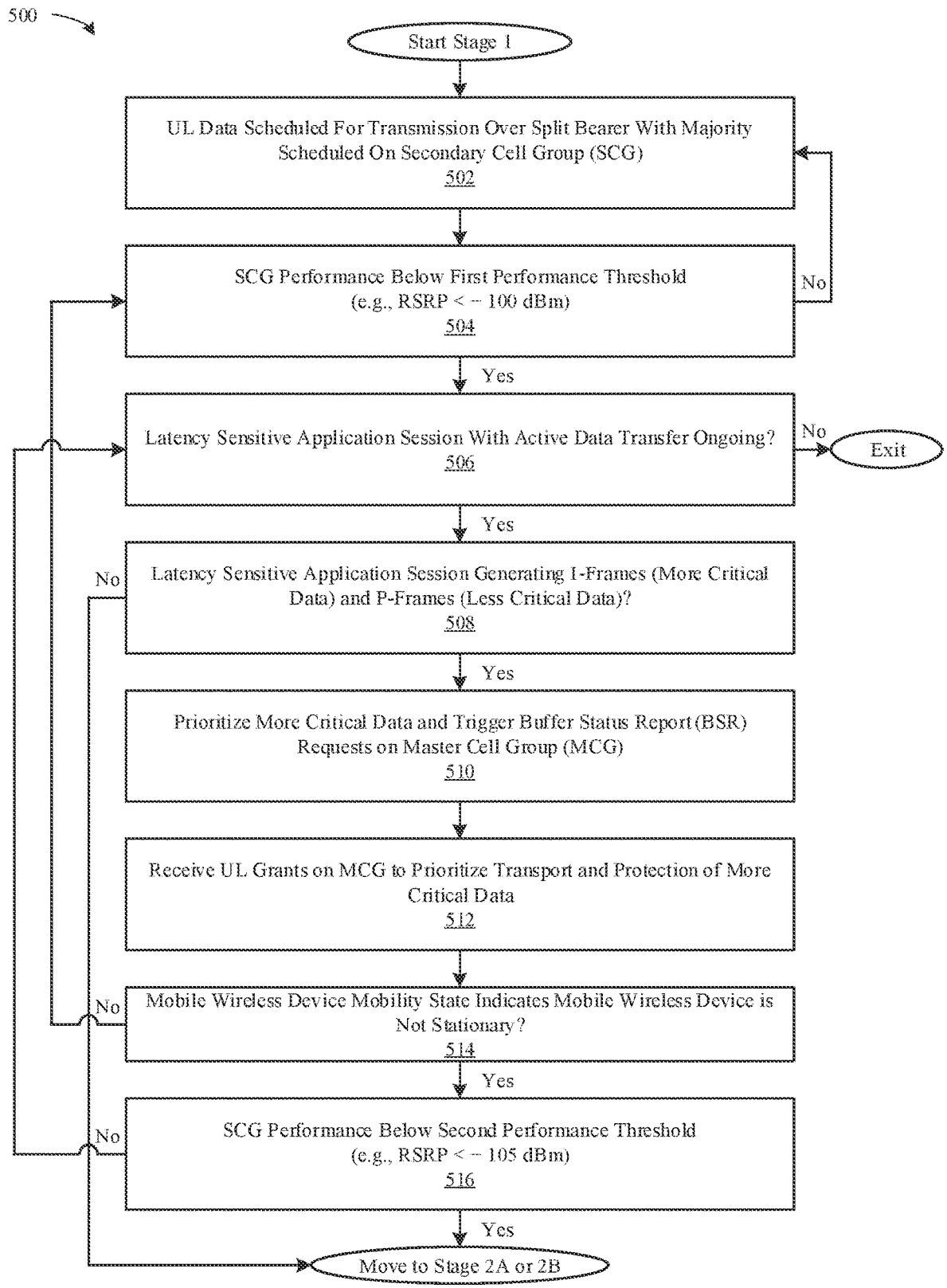
FIG. 5A illustrates flowchart of an exemplary first stage for managing dual link data transport of a latency sensitive application session for a wireless device in a stationary mobility state, according to some embodiments.

FIG. 5A illustrates a flowchart 500 of an exemplary first stage process for managing dual radio link UL data transport of a latency sensitive application session for a 5G-capable wireless device 102 while in a stationary mobility state. At 502, UL data is scheduled for transmission over a split radio bearer via a master cell group (MCG) and a secondary cell group (SCG) of a 5G NSA cellular wireless network, with a majority of UL data scheduled on the SCG. At 504, the 5G-capable wireless device 102 determines whether a performance of the SCG falls below a first performance threshold, e.g., a measured reference signal received power (RSRP) level is less than −100 dB. The first performance threshold can be higher than a corresponding measurement reporting threshold, such as an A2 threshold set by the 5G NSA cellular wireless network. When the SCG performance remains at or above the first performance threshold, the process returns to step 502. When the SCG performance falls below the first performance threshold, at 506, the 5G-capable wireless device 102 determines whether a latency sensitive application session with active UL data transfer is ongoing. When no latency sensitive application sessions with active UL data transfer are ongoing, the process ends. When there is a latency sensitive application session with active UL data transfer ongoing, the 5G-capable wireless device 102, at 508, determines whether the UL data for the latency sensitive application session can be separated into more critical data, e.g., information frames (I-frames) of a video application session, and less critical data, e.g., parity frames (P-frames) of the video application session. When the UL data for the latency sensitive application session cannot be separated, the 5G-capable wireless device moves onto a second stage process as described in FIG. 5B or in FIG. 5C. When the UL data for the latency sensitive application session can be separated into more critical data and less critical data, at 510, the 5G-capable wireless device 102 prioritizes UL transport of the more critical data before transport of the less critical data and triggers one or more buffer status report (BSR) request messages for UL transport via the MCG. In some embodiments, the latency sensitive application session generates (or provides to a baseband layer for UL transport) the more critical data at periodic intervals. In some embodiments, the 5G-capable wireless device 102 periodically triggers a BSR request for the MCG in anticipation of more critical data being generated and provided for UL transport by the latency sensitive application session. At 512, the wireless device 102 receives UL grants on the MCG on which to prioritize and send the more critical UL data before sending the less critical UL data for the latency sensitive application session. The 5G-capable wireless device 102 can continue to monitor performance for the latency sensitive application session to determine whether to continue to request additional UL grants on the MCG. At 514, the 5G-capable wireless device 102 determines whether a mobility state indicates that the 5G-capable wireless device 102 is stationary or non-stationary (in motion). When the mobility state indicates the 5G-capable wireless device 102 is stationary, the process returns to step 504. When the mobility state indicates the 5G-capable wireless device 102 is non-stationary, the 5G-capable wireless device 102, at 516, determines whether the SCG performance falls below a second performance threshold that is lower than the first performance threshold, e.g., RSRP<−105 dBm, where the second performance threshold is also above the measurement reporting threshold, e.g., above an A2 threshold used by the 5G NSA cellular wireless network. When the SCG performance equals or exceeds the second performance threshold, the process returns to step 506. When the SCG performance falls below the second performance threshold, the wireless device 102 proceeds to a second stage process as illustrated in FIG. 5B (stage 2A) or in FIG. 5C (stage 2B).

Figure 5B:
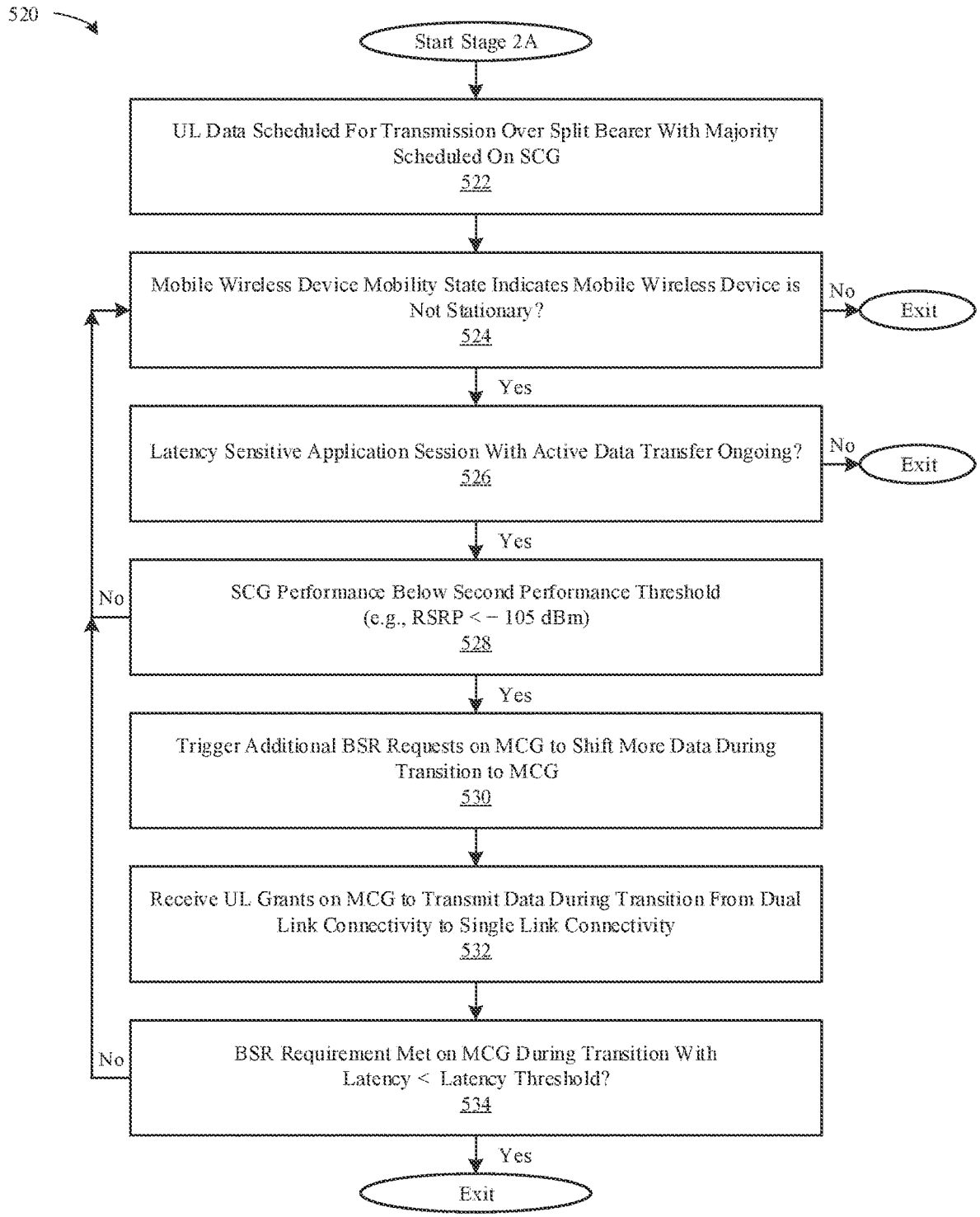
FIG. 5B illustrates a flowchart of an exemplary second stage for managing dual link data transport of a latency sensitive application session for a wireless device in a non-stationary mobility state, according to some embodiments.

FIG. 5B illustrates a flowchart 520 of an exemplary second stage process for managing dual radio link UL data transport of a latency sensitive application session for a 5G-capable wireless device 102 while in a non-stationary mobility state. At 522, UL data is scheduled for transmission over a split radio bearer via the MCG and the SCG of the 5G NSA cellular wireless network, with a majority of UL data scheduled on the SCG. At 524, the 5G-capable wireless device 102 determines whether a mobility state indicates that the 5G-capable wireless device 102 is stationary or non-stationary (in motion). When the mobility state indicates the 5G-capable wireless device 102 is stationary, the process ends. When the mobility state indicates the 5G-capable wireless device 102 is non-stationary, the 5G-capable wireless device 102, at 526, determines whether a latency sensitive application session with active UL data transfer is ongoing. When no latency sensitive application sessions with active UL data transfer are ongoing, the process ends. When there is a latency sensitive application session with active UL data transfer ongoing, the 5G-capable wireless device 102, at 528, determines whether the SCG performance falls below the second performance threshold that is lower than the first performance threshold, e.g., RSRP<−105 dBm, where the second performance threshold is also above the measurement reporting threshold, e.g., above an A2 threshold used by the 5G NSA cellular wireless network. When the SCG performance equals or exceeds the second performance threshold, the process returns to step 524. When the SCG performance falls below the second performance threshold, the 5G-capable wireless device 102, at 530, triggers one or more additional BSR requests on the MCG to shift all data during a transition from the SCG to the MCG. The additional BSR requests can include select values in a buffer size field to cause the 5G NSA cellular wireless network to shift data more quickly to the MCG from the SCG. In some cases, the 5G-capable wireless device requests to shift all UL data to the MCG form the SCG. In some cases, the select value in the buffer size field is a maximum allowed value for the buffer size field. In some embodiments, the 5G-capable wireless device 102 calculates a buffer size field value for the additional BSR requests based on an UL data throughput requirement of the latency sensitive application session. In some embodiments, the 5G-capable wireless device 102 uses the calculated BSR size field value in the additional BSR requests. In some embodiments, the 5G-capable wireless device 102 uses a maximum permissible BSR size field value in the additional BSR requests. At 532, the 5G-capable wireless device receives UL grants from the 5G NSA cellular wireless network on the MCG to transmit UL data only on the MCG during a transition from dual radio link connectivity via both the MCG and the SCG to single radio link connectivity via the MCG. At 534, the 5G-capable wireless device 102 determines i) whether BSR requirements for UL data transport for the latency sensitive application session has been met on the MCG during the transition and ii) that a latency requirement of the latency sensitive application session has been satisfied, e.g., measured latency falls below a latency threshold. When the BSR requirement has not been met or the latency requirement has not been satisfied, the 5G-capable wireless device 102 returns to step 524 to continue the process. When the BSR requirement has been met and the latency requirement has also been satisfied during the transition, the process ends.

Figure 5C:
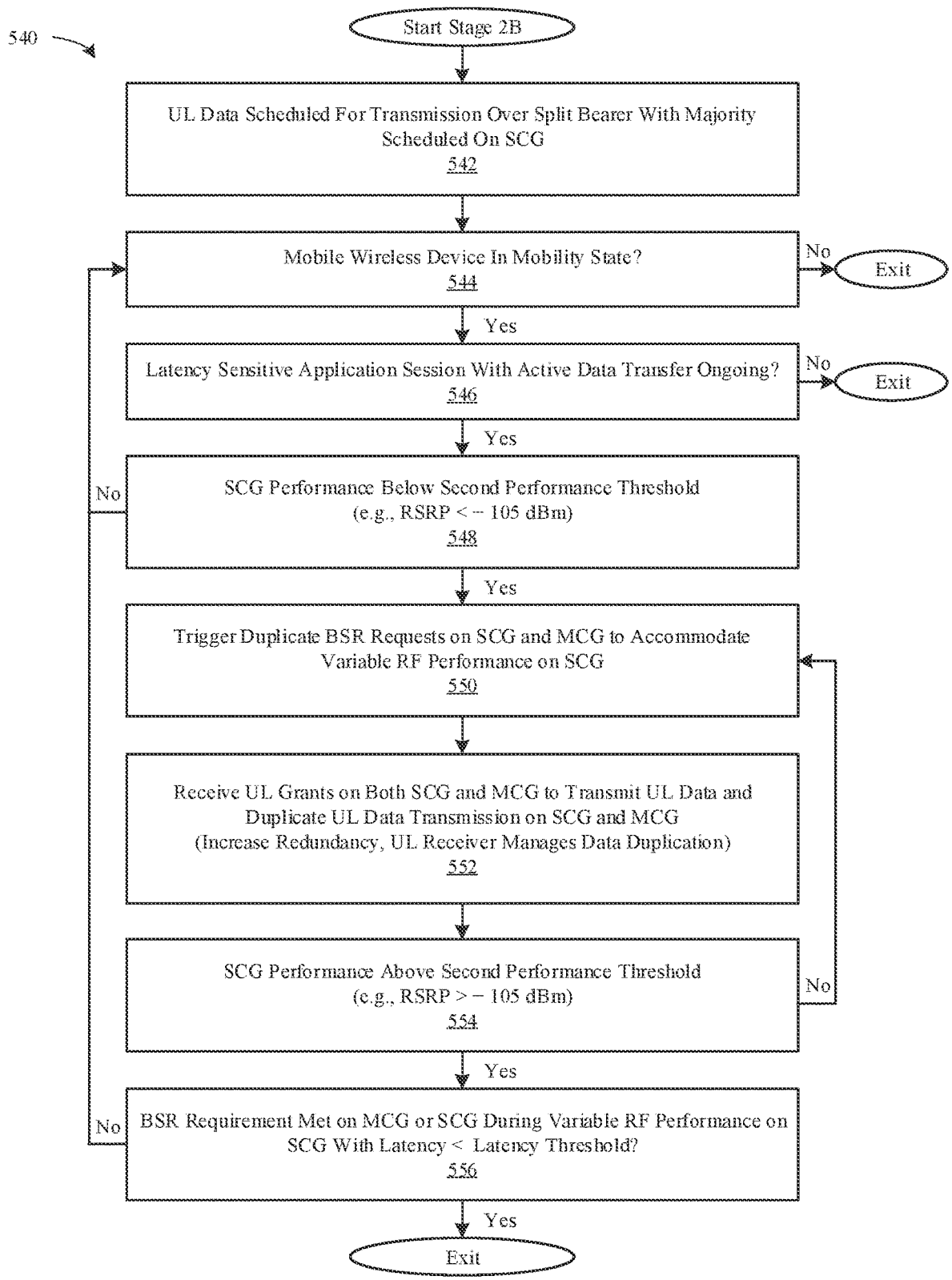
FIG. 5C illustrates a flowchart of another exemplary second stage for managing dual link data transport of a latency sensitive application session for a wireless device in a non-stationary mobility state, according to some embodiments.

FIG. 5C illustrates a flowchart 540 of another exemplary second stage process for managing dual radio link UL data transport of a latency sensitive application session for a 5G-capable wireless device 102 while in a non-stationary mobility state. At 542, UL data is scheduled for transmission over a split radio bearer via the MCG and the SCG of the 5G NSA cellular wireless network, with a majority of UL data scheduled on the SCG. At 544, the 5G-capable wireless device 102 determines whether a mobility state indicates that the 5G-capable wireless device 102 is stationary or non-stationary (in motion). When the mobility state indicates the 5G-capable wireless device 102 is stationary, the process ends. When the mobility state indicates the 5G-capable wireless device 102 is non-stationary, the 5G-capable wireless device 102, at 546, determines whether a latency sensitive application session with active UL data transfer is ongoing. When no latency sensitive application sessions with active UL data transfer are ongoing, the process ends. When there is a latency sensitive application session with active UL data transfer ongoing, the 5G-capable wireless device 102, at 548, determines whether the SCG performance falls below the second performance threshold that is lower than the first performance threshold, e.g., RSRP<−105 dBm, where the second performance threshold is also above the measurement reporting threshold, e.g., above an A2 threshold used by the 5G NSA cellular wireless network. When the SCG performance equals or exceeds the second performance threshold, the process returns to step 544. When the SCG performance falls below the second performance threshold, the wireless device 102, at 550 sends duplicate BSR requests on both the SCG and the MCG to accommodate variable radio conditions on the SCG. The duplicate BSR requests can include select values in the buffer size fields to cause the 5G NSA cellular wireless network to grant additional radio resources to the 5G-capable wireless device 102. In some embodiments, the wireless device 102 calculates a BSR size field value based on an UL data throughput requirement of the latency sensitive application session. In some embodiments, the 5G-capable wireless device 102 uses the calculated BSR size field value in the duplicate BSR requests. In some embodiments, the 5G-capable wireless device 102 uses a maximum permissible buffer size field value in the duplicate BSR requests. At 552, the 5G-capable wireless device receives UL grants on both the SCG and the MCG to transmit UL data for the latency sensitive application session. The 5G-capable wireless device 102 can use UL grants received via either the SCG or the MCG to transport the UL data as quickly as possible, e.g., via the earliest received UL grant on either SCG or MCG, or to transport the UL data duplicated over both the SCG and the MCG via UL grants on each of the SCG and the MCG. Duplicate transmission increases redundancy to allow a receiver of the UL data to improve performance under variable RF conditions using the duplicated UL data. At 554, the 5G-capable wireless device 102 determines whether SCG performance exceeds the second performance threshold, e.g., RSRP>−105 dBm. When SCG performance remains below the second performance threshold, e.g., RSRP<−105 dBm, the 5G-capable wireless device 102 continues sending duplicate BSR requests for both the SCG and the MCG. When SCG performance exceeds the second performance threshold, e.g., RSRP>−105 dBm, the 5G-capable wireless device 102, at 556, determines i) whether BSR requirements for UL data transport for the latency sensitive application session have been met on the MCG during the variable RF performance conditions and ii) that a latency requirement of the latency sensitive application session has been satisfied, e.g., measured latency falls below a latency threshold. When the BSR requirement has not been met or the latency requirement has not been satisfied, the 5G-capable wireless device 102 returns to step 544 to continue the process. When the BSR requirement has been met and the latency requirement has also been satisfied during the transition, the process ends.

The processes illustrated in FIGS. 5A, 5B, and 5C can be used for 5G to 4G radio link transitions and also for 5G radio link transitions between frequency bands (e.g., between FR1 and FR2). The process illustrated in FIG. 5C can also be used during variable RF conditions to increase redundancy temporarily via two radio links until a single radio link satisfies performance requirements for a latency sensitive application session. The processes can be used on 5G NSA cellular wireless networks and also on 5G standalone (SA) wireless networks, such as when managing data transport for multiple 5G radio links across two different radio frequency bands used for uplink transmission by a 5G-capable wireless device 102.

Figure 6A:
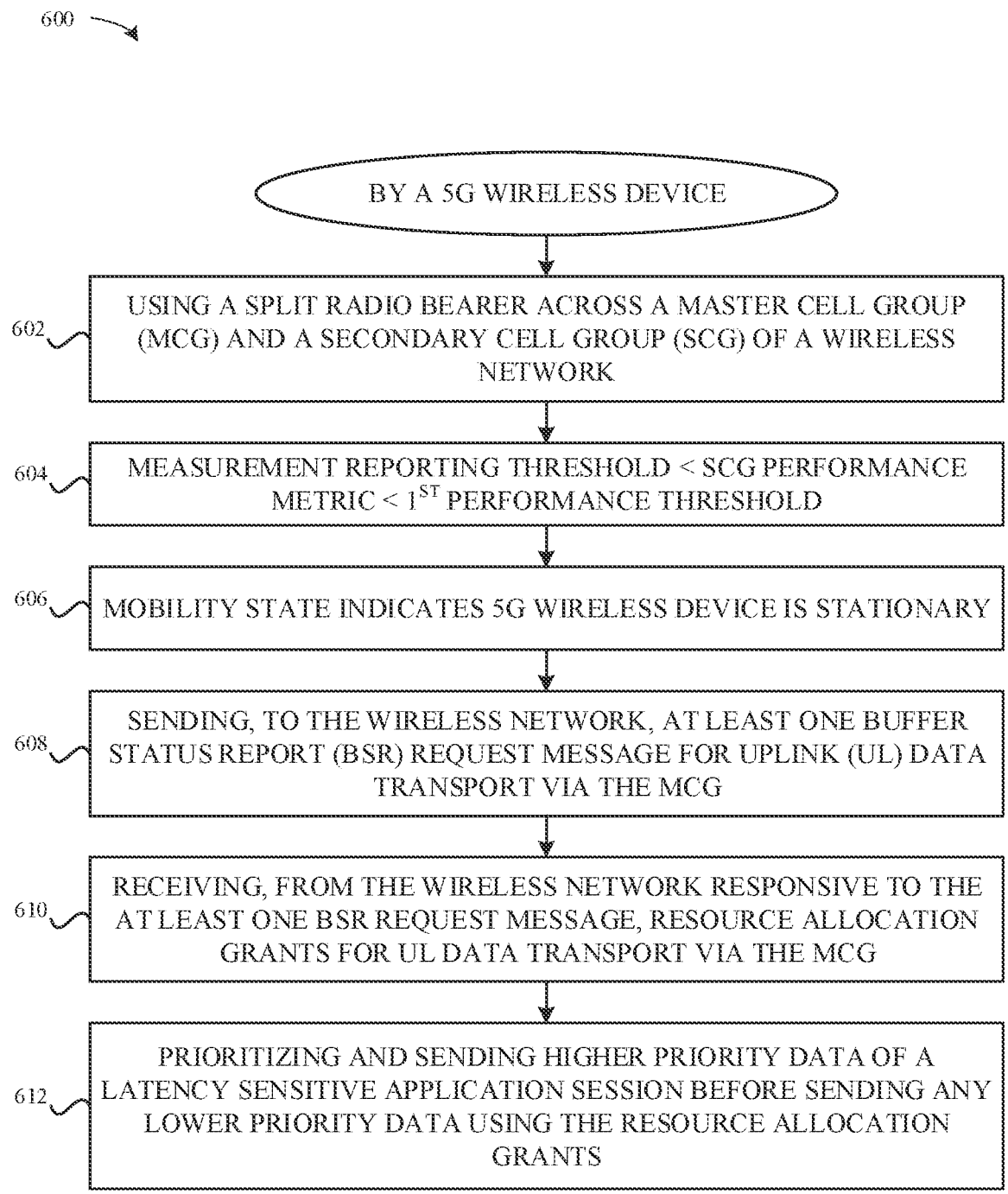
FIG. 6A illustrates an exemplary method for managing dual link data transport of a latency sensitive application session for a wireless device in a stationary mobility state, according to some embodiments.

FIG. 6A illustrates a flowchart 500 of an exemplary method for managing dual radio link data transport of a latency sensitive application for a 5G wireless device 102 in a non-stationary mobility state. At 602, the 5G wireless device uses a split radio bearer across a master cell group (MCG) and a secondary cell group (SCG) of a wireless network. At 604, a performance metric for the SCG falls below a first performance threshold, where the SCG performance metric exceeds a measurement reporting threshold. At 606, a state of the 5G wireless device 102 indicates that the 5G wireless device 102 is stationary. At 608, the 5G wireless device 102 sends, to the wireless network, at least one BSR request message for UL data transport via the MCG. At 610, the 5G wireless device 102 receives, from the wireless network responsive to the at least one BSR request message, resource allocation grants for UL data transport via the MCG. At 612, the 5G wireless device prioritizes and sends higher priority data of a latency sensitive application session before sending any lower priority data using the resource allocation grants received from the wireless network.

Figure 6B:
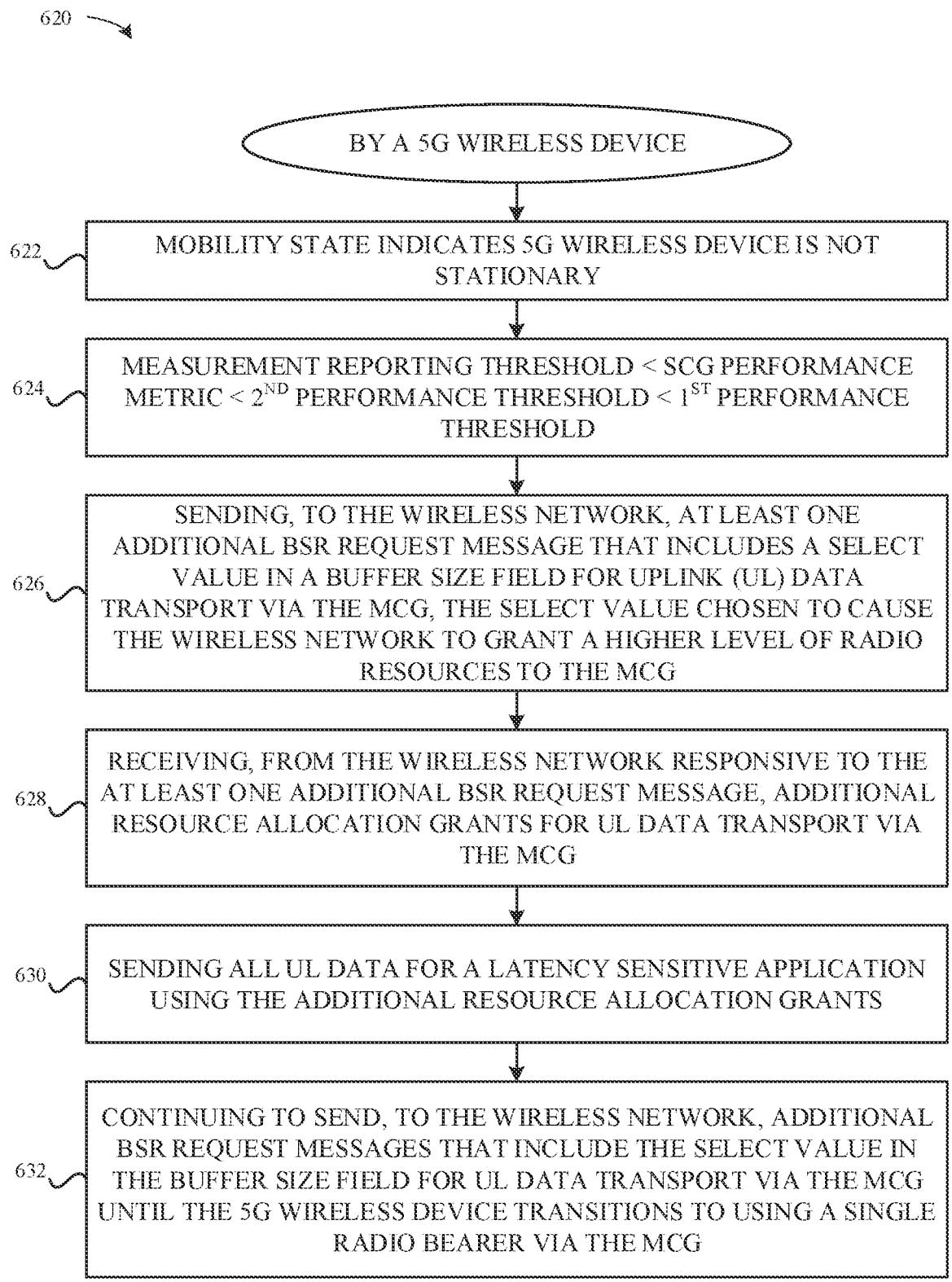
FIG. 6B illustrates an exemplary method for managing dual link data transport of a latency sensitive application session for a wireless device in a non-stationary mobility state, according to some embodiments.

FIG. 6B illustrates a flowchart 620 of an exemplary method for managing dual link data transport of a latency sensitive application for a 5G wireless device 102 in a non-stationary mobility state. At 622, a mobility state of the 5G wireless device 102 indicates that the 5G wireless device is not stationary (e.g., in motion). At 624, a performance metric for a secondary cell group (SCG) falls below a second performance threshold, which is lower than a first performance threshold, and exceeds a measurement reporting threshold, e.g., an A2 threshold used by a 5G NSA cellular wireless network. At 626, the 5G wireless device sends to the wireless network at least one additional BSR request message that includes a select value in a buffer size field for UL data transport via a master cell group (MCG), where the select value is chosen to cause the wireless network to grant a higher level of radio resources to the MCG. At 628, the 5G wireless device receives, from the wireless network responsive to the at least one additional BSR request message, additional resource allocation grants for UL data transport via the MCG. At 630, the 5G wireless device sends all UL data for a latency sensitive application using the additional resource allocation grants received from the wireless network. At 632, the 5G wireless device 102 continues to send to the wireless network additional BSR request messages that include the select value in the buffer size field for UL data transport via the MCG until the 5G wireless device 102 transitions to using a single radio bearer via the MCG. In some embodiments, the select value is a value calculated by the 5G wireless device 102 to support UL data transport for a latency sensitive application. In some embodiments, the select value in the buffer size field exceeds an amount of data in a corresponding buffer. In some embodiments, the select value is a maximum allowed value for the buffer size field.

Figure 6C:
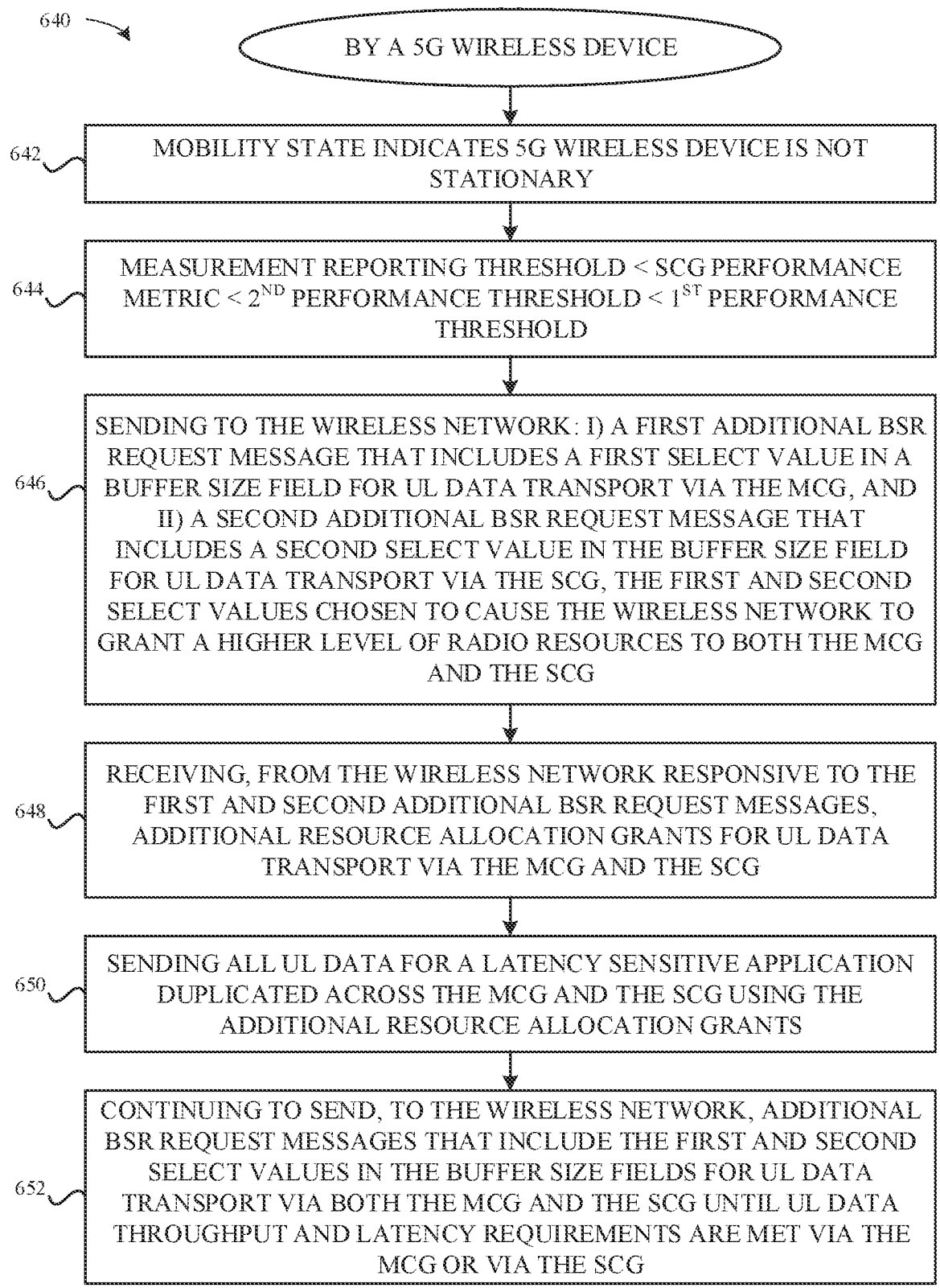
FIG. 6C illustrates another exemplary method for managing dual link data transport of a latency sensitive application session for a wireless device in a non-stationary mobility state, according to some embodiments.

FIG. 6C illustrates a flowchart 640 of another exemplary method for managing dual link data transport of a latency sensitive application for a 5G wireless device 102 in a non-stationary mobility state. At 642, a mobility state of the 5G wireless device 102 indicates that the 5G wireless device is not stationary (e.g., in motion). At 644, a performance metric for a secondary cell group (SCG) falls below a second performance threshold, which is lower than a first performance threshold, and exceeds a measurement reporting threshold, e.g., an A2 threshold used by a 5G NSA cellular wireless network. At 646, the 5G wireless device sends to the wireless network a first additional BSR request message that includes a first select value in a buffer size field for UL data transport via a master cell group (MCG) and a second additional BSR request message that includes a second select value in a buffer size field for UL data transport via a secondary cell group (SCG). At 648, the 5G wireless device receives, from the wireless network responsive to the first and second additional BSR request messages, additional resource allocation grants for UL data transport via the MCG and the SCG. At 650, the 5G wireless device sends all UL data for a latency sensitive application duplicated across the MCG and the SCG using the additional resource allocation grants received from the wireless network. At 652, the 5G wireless device 102 continues to send to the wireless network additional BSR request messages that include the select in the buffer size field for UL data transport via both the MCG and the SCG until UL data throughput and latency requirements are met via the MCG or via the SCG. In some embodiments, the select value is a value calculated by the 5G wireless device 102 to support UL data transport for a latency sensitive application. In some embodiments, the select value in the buffer size field exceeds an amount of data in a corresponding buffer. In some embodiments, the select value is a maximum allowed value for the buffer size field.

Representative Exemplary Apparatus

Figure 7:
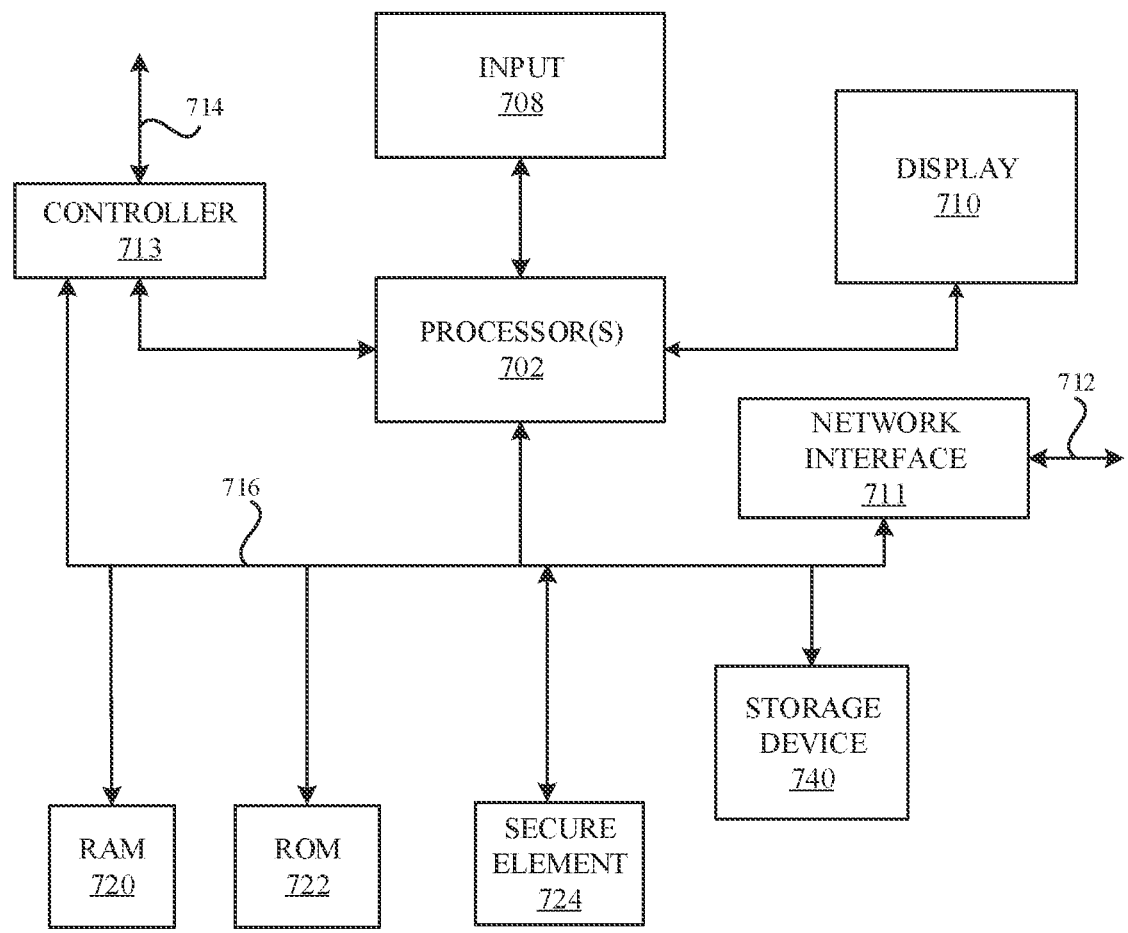
FIG. 7 illustrates a block diagram of exemplary elements of a mobile wireless device, according to some embodiments.

FIG. 7 illustrates in block diagram format an exemplary computing device 700 that can be used to implement the various components and techniques described herein, according to some embodiments. In particular, the detailed view of the exemplary computing device 700 illustrates various components that can be included in the mobile wireless device 102. As shown in FIG. 7, the computing device 700 can include one or more processors 702 that represent microprocessors or controllers for controlling the overall operation of computing device 700. In some embodiments, the computing device 700 can also include a user input device 708 that allows a user of the computing device 700 to interact with the computing device 700. For example, in some embodiments, the user input device 708 can take a variety of forms, such as a button, keypad, dial, touch screen, audio input interface, visual/image capture input interface, input in the form of sensor data, etc. In some embodiments, the computing device 700 can include a display 710 (screen display) that can be controlled by the processor(s) 702 to display information to the user (for example, information relating to incoming, outgoing, or active communication sessions). A data bus 716 can facilitate data transfer between at least a storage device 740, the processor(s) 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include wireless circuitry, such as a wireless transceiver and/or baseband processor. The computing device 700 can also include a secure element 724. The secure element 724 can include an eUICC 108.

The computing device 700 also includes a storage device 740, which can include a single storage or a plurality of storages (e.g., hard drives), and includes a storage management module that manages one or more partitions within the storage device 740. In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when 5G, LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing uplink (UL) data transport for a fifth generation (5G) wireless device, the method comprising:

by the 5G wireless device:

while i) using a split radio bearer across a master cell group (MCG) and a secondary cell group (SCG) of a wireless network, ii) a latency sensitive application session is active with data separable into multiple priorities, iii) a performance metric for the SCG falls below a first performance threshold, and iv) a mobility state indicates the 5G wireless device is stationary:

sending, to the wireless network, at least one buffer status report (BSR) request message for the UL data transport via the MCG;

receiving, from the wireless network responsive to the at least one BSR request message, resource allocation grants for the UL data transport via the MCG; and prioritizing and sending higher priority data of the latency sensitive application session before sending any lower priority data using the resource allocation grants, wherein the first performance threshold exceeds a measurement reporting threshold indicated by the wireless network.

2. The method of claim 1, further comprising:

by the 5G wireless device:

while i) the mobility state indicates the 5G wireless device is not stationary, and ii) the performance metric for the SCG falls below a second performance threshold lower than the first performance threshold and above the measurement reporting threshold:
sending, to the wireless network, at least one additional BSR request message that includes a select value in a buffer size field for the UL data transport via the MCG, the select value chosen to cause the wireless network to grant a higher level of radio resources to the MCG;
receiving, from the wireless network responsive to the at least one additional BSR request message, additional resource allocation grants for the UL data transport via the MCG; and
sending all UL data for the latency sensitive application session using the additional resource allocation grants.

3. The method of claim 2, further comprising:
by the 5G wireless device:
while i) the mobility state indicates the 5G wireless device is not stationary, and ii) the performance metric for the SCG falls below the second performance threshold:
continuing to send, to the wireless network, additional BSR request messages that include the select value in the buffer size field for the UL data transport via the MCG until the 5G wireless device transitions to using a single radio bearer via the MCG.

4. The method of claim 1, further comprising:
by the 5G wireless device:
while i) the mobility state indicates the 5G wireless device is not stationary, and ii) the performance metric for the SCG falls below a second performance threshold lower than the first performance threshold and above the measurement reporting threshold:
sending to the wireless network:
a first additional BSR request message that includes a first select value in a buffer size field for the UL data transport via the MCG and
a second additional BSR request message that includes a second select value in the buffer size field for the UL data transport via the SCG;
receiving, from the wireless network responsive to the first and second additional BSR request messages, additional resource allocation grants for the UL data transport via the MCG and the SCG; and
sending all UL data for the latency sensitive application session duplicated across the MCG and the SCG using the additional resource allocation grants,
wherein the first select value and the second select value are chosen to cause the wireless network to grant a higher level of radio resources to both the MCG and the SCG.

5. The method of claim 4, further comprising:
by the 5G wireless device:
while i) the mobility state indicates the 5G wireless device is not stationary, and ii) the performance metric for the SCG falls below the second performance threshold:
continuing to send, to the wireless network, additional BSR request messages that include the first select value or the second select value in the buffer size field for the UL data transport via both the MCG and the SCG until UL data throughput and latency requirements are met via the MCG or via the SCG.

6. The method of claim 1, wherein:
the mobility state is based on a mobility metric determined by a motion co-processor of the 5G wireless device.

7. The method of claim 1, wherein:
the SCG comprises first 5G cellular resources using a first 5G frequency range (FR1) of radio frequencies below 8 GHz, and
the MCG comprises second 5G cellular resources using a second 5G frequency range (FR2) of millimeter wave frequencies above 24 GHz.

8. The method of claim 1, wherein:
the SCG comprises cellular resources allocated in accordance with a fourth generation (4G) Long Term Evolution (LTE) standard communications protocol, and
the MCG comprises 5G cellular resources allocated in accordance with a 5G standard communications protocol, wherein the 5G cellular resources are different from the cellular resources.

9. The method of claim 1, wherein:
the first performance threshold comprises a reference signal received power value at least 10 dB higher than the measurement reporting threshold; and
the measurement reporting threshold comprises an A2 measurement threshold set by the wireless network.

10. The method of claim 1, wherein:
the latency sensitive application session comprises a video streaming application session or a video call application session;
the higher priority data comprises information frames (I-frames); and
the lower priority data comprises parity frames (P-frames).

11. The method of claim 10, wherein:
I-frames for the latency sensitive application session occur with a periodic pattern; and
a baseband component of the 5G wireless device sends the at least one BSR request for a set of I-frames before receiving the set of I-frames from an application processor of the 5G wireless device.

12. An apparatus configurable for operation in a fifth generation (5G) wireless device, the apparatus comprising one or more processors coupled to a memory storing instructions that, when executed by the one or more processors, cause the 5G wireless device to:
while i) using a split radio bearer across a master cell group (MCG) and a secondary cell group (SCG) of a wireless network, ii) a latency sensitive application session is active with data separable into multiple priorities, iii) a performance metric for the SCG falls below a first performance threshold, and iv) a mobility state indicates the 5G wireless device is stationary:
send, to the wireless network, at least one buffer status report (BSR) request message for uplink (UL) data transport via the MCG;
receive, from the wireless network responsive to the at least one BSR request message, resource allocation grants for the UL data transport via the MCG; and
prioritize and send higher priority data of the latency sensitive application session before sending any lower priority data using the resource allocation grants, wherein the first performance threshold exceeds a measurement reporting threshold indicated by the wireless network.

13. The apparatus of claim 12, wherein execution of the instructions further causes the 5G wireless device to:
while i) the mobility state indicates the 5G wireless device is not stationary, and ii) the performance metric for the SCG falls below a second performance threshold lower than the first performance threshold and above the measurement reporting threshold:
send, to the wireless network, at least one additional BSR request message that includes a select value in a buffer size field for the UL data transport via the MCG, the select value chosen to cause the wireless network to grant a higher level of radio resources to the MCG;
receive, from the wireless network responsive to the at least one additional BSR request message, additional resource allocation grants for the UL data transport via the MCG; and
send all UL data for the latency sensitive application session using the additional resource allocation grants.

14. The apparatus of claim 13, wherein execution of the instructions further causes the 5G wireless device to:
while i) the mobility state indicates the 5G wireless device is not stationary, and ii) the performance metric for the SCG falls below the second performance threshold:
continue to send, to the wireless network, additional BSR request messages that include the select value in the buffer size field for the UL data transport via the MCG until the 5G wireless transitions to using a single radio bearer via the MCG.

15. The apparatus of claim 12, wherein execution of the instructions further causes the 5G wireless device to:
while i) the mobility state indicates the 5G wireless device is not stationary, and ii) the performance metric for the SCG falls below a second performance threshold lower than the first performance threshold and above the measurement reporting threshold:
send, to the wireless network, a first additional BSR request message that includes a first select value in a buffer size field for the UL data transport via the MCG and a second additional BSR request message that includes a second select value in the buffer size field for the UL data transport via the SCG;
receive, from the wireless network responsive to the first and second additional BSR request messages, additional resource allocation grants for the UL data transport via the MCG and the SCG; and
send all UL data for the latency sensitive application session duplicated across the MCG and the SCG using the additional resource allocation grants,
wherein the first select value and the second select value are chosen to cause the wireless network to grant a higher level of radio resources to both the MCG and the SCG.

16. The apparatus of claim 15, wherein execution of the instructions further causes the 5G wireless device to:
while i) the mobility state indicates the 5G wireless device is not stationary, and ii) the performance metric for the SCG falls below the second performance threshold:
continue to send, to the wireless network, additional BSR request messages that include the first select value or the second select value in the buffer size field for the UL data transport via both the MCG and the SCG until UL data throughput and latency requirements are met via the MCG or via the SCG.

17. The apparatus of claim 16, wherein:
the latency sensitive application session comprises a video streaming application session or a video call application session;
the higher priority data comprises information frames (I-frames); and
the lower priority data comprises parity frames (P-frames).

18. A fifth generation (5G) wireless device comprising:
wireless circuitry comprising a plurality of antennas;
at least one processor communicatively coupled to the wireless circuitry and to a memory storing instructions that, when executed by the at least one processor, cause the 5G wireless device to:
while i) using a split radio bearer across a master cell group (MCG) and a secondary cell group (SCG) of a wireless network, ii) a latency sensitive application session is active with data separable into multiple priorities, iii) a performance metric for the SCG falls below a first performance threshold, and iv) a mobility state indicates the 5G wireless device is stationary:
send, to the wireless network, at least one buffer status report (BSR) request message for uplink (UL) data transport via the MCG;
receive, from the wireless network responsive to the at least one BSR request message, resource allocation grants for the UL data transport via the MCG; and
prioritize and send higher priority data of the latency sensitive application session before sending any lower priority data using the resource allocation grants,
wherein the first performance threshold exceeds a measurement reporting threshold indicated by the wireless network.

19. The 5G wireless device of claim 18, wherein execution of the instructions further causes the 5G wireless device to:
while i) the mobility state indicates the 5G wireless device is not stationary, and ii) the performance metric for the SCG falls below a second performance threshold lower than the first performance threshold and above the measurement reporting threshold:
send, to the wireless network, at least one additional BSR request message that includes a select value in a buffer size field for the UL data transport via the MCG, the select value chosen to cause the wireless network to grant a higher level of radio resources to the MCG;
receive, from the wireless network responsive to the at least one additional BSR request message, additional resource allocation grants for the UL data transport via the MCG; and
send all UL data for the latency sensitive application session using the additional resource allocation grants.

20. The 5G wireless device of claim 18, wherein execution of the instructions further causes the 5G wireless device to:
while i) the mobility state indicates the 5G wireless device is not stationary, and ii) the performance metric for the SCG falls below a second performance threshold lower than the first performance threshold and above the measurement reporting threshold:

send, to the wireless network, a first additional BSR request message that includes a first select value in a buffer size field for the UL data transport via the MCG and a second additional BSR request message that includes a second select value in the buffer size field for UL data transport via the SCG;

receive, from the wireless network responsive to the first and second additional BSR request messages, additional resource allocation grants for the UL data transport via the MCG and the SCG; and send all UL data for the latency sensitive application session duplicated across the MCG and the SCG using the additional resource allocation grants, wherein the first select value and the second select value are chosen to cause the wireless network to grant a higher level of radio resources to both the MCG and the SCG.

\* \* \* \* \*